United States Patent [19]
Sato

[11] 4,451,125
[45] May 29, 1984

[54] BEHIND APERTURE LENS SYSTEM

[75] Inventor: Shigetada Sato, Tokyo, Japan

[73] Assignee: Asahi Kogaku Kogyo Kabushiki Kaisha, Tokyo, Japan

[21] Appl. No.: 479,235

[22] Filed: Mar. 28, 1983

[30] Foreign Application Priority Data

Mar. 26, 1982 [JP] Japan .................. 57-48525

[51] Int. Cl.³ .................................. G02B 9/60
[52] U.S. Cl. ..................................... 350/465
[58] Field of Search ........................ 350/465

[56] References Cited

U.S. PATENT DOCUMENTS 4,173,396 11/1979 Yokota ...................... 350/465

FOREIGN PATENT DOCUMENTS 2808799 9/1978 Fed. Rep. of Germany ...... 350/465
44-24069 10/1969 Japan ................................. 350/465

*Primary Examiner*—John K. Corbin
*Assistant Examiner*—Scott J. Sugarman
*Attorney, Agent, or Firm*—Sughrue, Mion, Zinn, Macpeak & Seas

[57] ABSTRACT

A compact, five-element, high-performance behind aperture lens system comprising a positive-meniscus first lens, a negative second lens, a positive third lens, a double-concave negative fourth lens, and a double-convex positive fifth lens in the order from the object side.

6 Claims, 8 Drawing Figures

BEHIND APERTURE LENS SYSTEM

BACKGROUND OF THE INVENTION

Compact cameras have found wide spread use in recent years, and there is a need for bright compact lens systems therefor.

The present invention relates to a highly bright, compact behind aperture lens having a wide angle of view of 60° or more, F number on the order of 2.8, and an overall lens length from the image plane being about 1.1 times the combined focal length of the lens system.

Bright, compact lenses having a wide angle of view of 60° or more with F number being on the order of 2.8 have heretofore been known from Japanese Laid-Open Patent Publications Nos. 54-30027 and 56-39510, for example. The disclosed lens arrangements are of the modified Tesaar type having a first positive lens composed of two lens elements.

SUMMARY OF THE INVENTION

According to the present invention, positive and negative lenses are alternately arranged in order from the object side, and the lens system is given a suitable power distribution and shape, so that a lens system can be found which has its high-order coma, flare, distortion, and the like from the center to the periphery of the picture plane, well compensated for in a balanced manner.

DESCRIPTION OF THE PREFERRED EMBODIMENT

Figure 1:
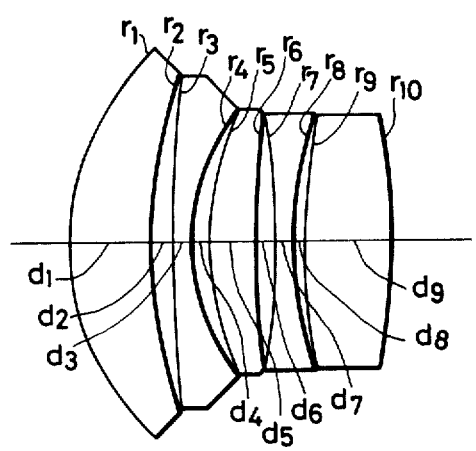
FIGS. 1, 3, 5 and 7 are cross-sectional views of lenses according to Examples 1, 2, 3 and 4, respectively.
Figure 2:
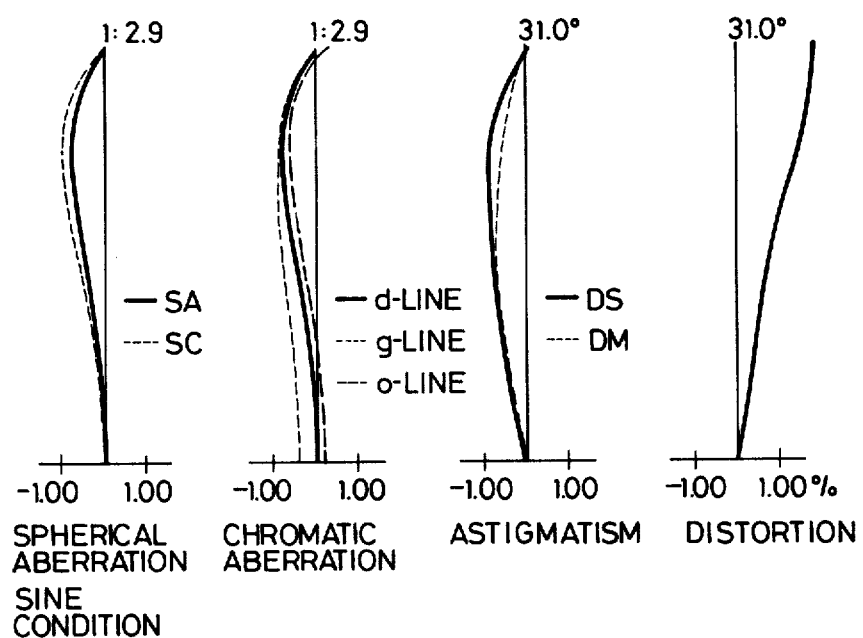
FIGS. 2, 4, 6 and 8 are diagrams showing aberrations of the lenses according to Examples 1, 2, 3 and 4, respectively.
Figure 3:
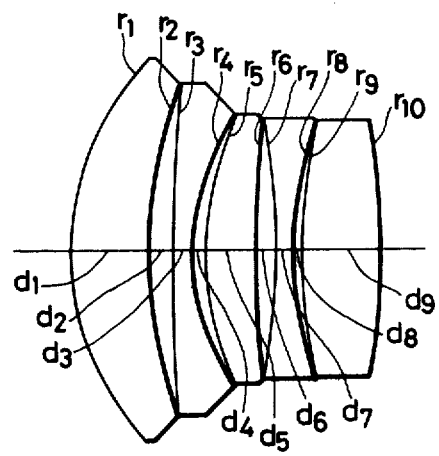
Figure 4:
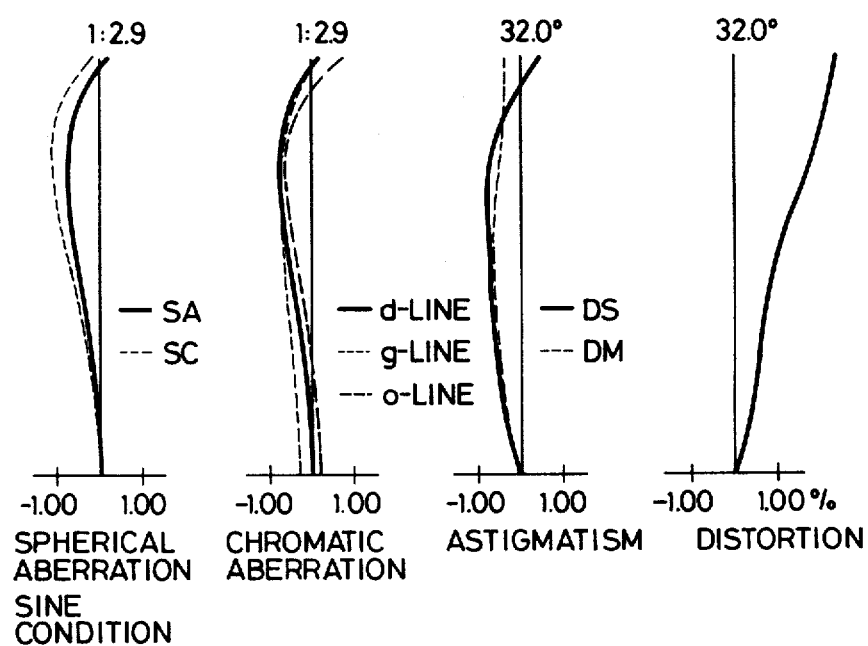
Figure 5:
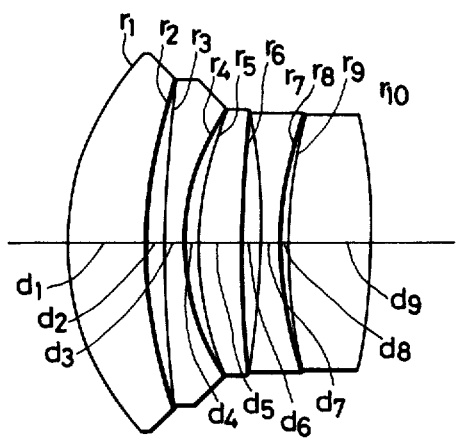
Figure 6:
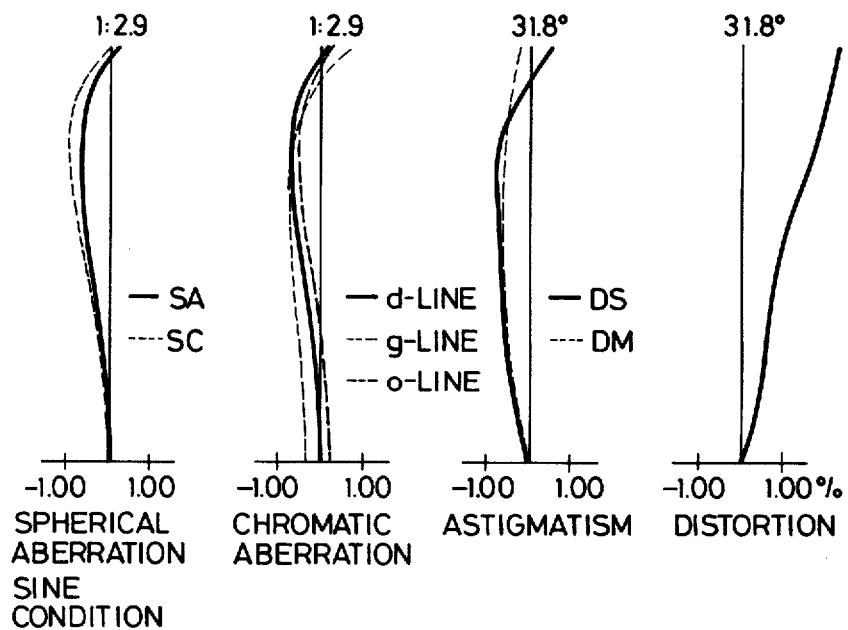
Figure 7:
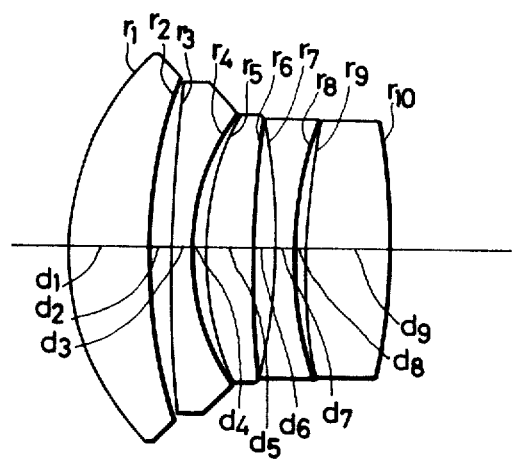
Figure 8:
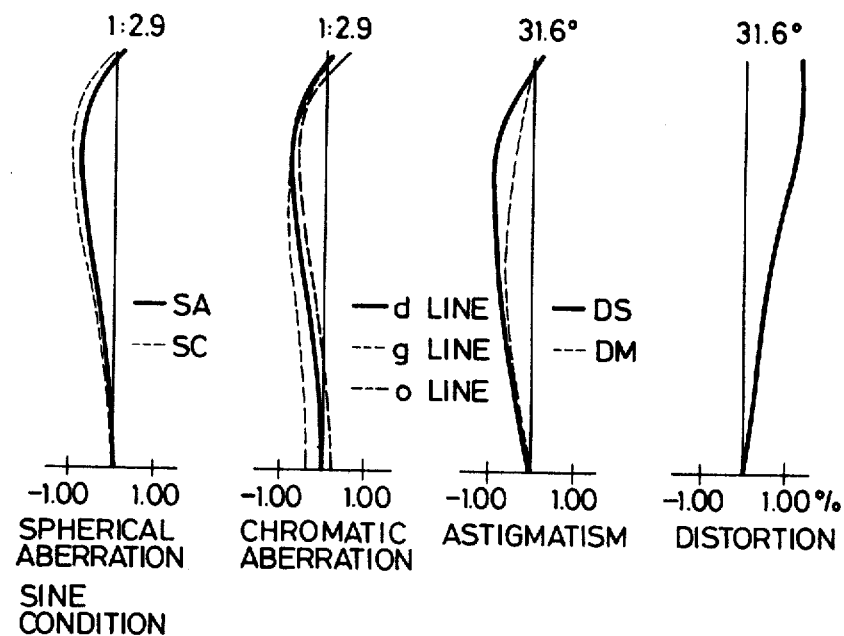

According to a lens arrangement of the present invention, a compact, five-element, high-performance behind aperture lens system comprises a positive meniscus lens (first lens), a negative lens (second lens), a positive lens (third lens), a biconcave negative lens (fourth lens), and a biconvex positive lens (fifth lens). The lenses are arranged in the order from the object side. The behind aperture lens system satisfies the following conditions:

(1) $1.15 < f/f_{1,2} < 1.55$
(2) $1.600 < (\nu_1 - \nu_2)/(\nu_1/n_1 - \nu_2/n_2)$
(3) $1.200 < f/n_4 |f_{7,8}| < 1.450$, $f_{7,8} < 0$
(4) $2.10 < f/f_1 < 3.00$
(5) $0.90 < f_5/|f_4| < 1.50$, $f_4 < 0$
(6) $0.60 < f_{10}/|f_7| < 0.80$, $f_7 < 0$
(7) $1.00 < f_9/|f_8| < 1.30$, $f_8 < 0$ where
- $f$: combined focal length of the overall lens system,
- $f_{1,2}$: focal length of the first lens,
- $\nu_i$: Abbe number of the ith lens,
- $n_i$: refractive index of the ith lens with respect to d-line,
- $f_{7,8}$: focal length of the fourth lens,
- $f_1$: focal length of the first lens on its surface on the object side,
- $f_4$: focal length of the second lens on its surface on the image side,
- $f_5$: focal length of the third lens on its surface on the object side,
- $f_7$: focal length of the fourth lens on its surface on the object side,
- $f_8$: focal length of the fourth lens on its surface on the image side,
- $f_9$: focal length of the fifth lens on its surface on the object side, and
- $f_{10}$: focal length of the fifth lens on its surface on the image side.

The foregoing conditions will now be described.

The condition (1) is required to render the lens system small in size. If the upper limit of the condition (1) was exceeded, then the lens system could advantageously be small in size, but positive distortion would become larger and it would be difficult to effect compensation at other regions. If the lower limit of the condition (1) was exceeded, then the overall length of the lens would be increased, and it would be difficult to reduce the diameter of the front lens while permitting a sufficient amount of peripheral light to be picked up, a disadvantage which would fail to reduce the size of the lens system. More preferably, the condition (1) is limited to $1.24 < f/f_{1,2} < 1.44$.

The condition (2) is imposed on the refractive indices and Abbe numbers of the first and second lenses to reduce the Petzval sum of the entire lens system in case the first lens is provided with a strong convergent action as defined by the condition (1) for the purpose of making the lens system small in size. If the lower limit of the condition (2) was exceeded, then it would become difficult to hold the positive Petzval sum generated by the lens group to a minimum and prevent an increase in the curvature of field while meeting the achromatic conditions for the first and second lenses.

The condition (3) serves to cancel the positive Petzval sum of the positive lenses of the lens system with the negative Petzval sum generated by the fourth lens to compensate for an increased curvature of field. The lower limit of the condition (3) is a limit for gaining the intended advantage. If the upper limit of the condition (3) was exceeded, then the concave surfaces of the fourth lens would have an increased divergent action, spherical aberration and astigmatism thereof would be increased, and it would be difficult to make compensation at other regions. More preferably, the condition (3) is limited to $$1.310 < f/n_4 |f_{7,8}| < 1.390, f_{7,8} < 0.$$

The condition (4) is complementary to the condition (1), and is needed to improve aberrations, particularly spherical aberration, while at the same time satisfying the condition (1). If the lower limit of the condition (4) was exceeded, then the convergent action by the front portion of the lens system would become weak, failing to render the lens system smaller in size. If the upper limit of the condition (4) was exceeded, the size of the lens system could be smaller in size, but more negative spherical aberration would result, and it would become difficult to carry out compensation at other regions. More preferably, the condition (4) is limited to $2.28 < f/f_1 < 2.90$.

The conditions (5), (6), (7) are required to effect balanced compensation of various aberrations such as coma, astigmatism, and distortion, in addition to correction of spherical aberration of the overall lens system. If the focal lengths fell outside of the ranges of these conditions, then the aberrations would be corrected out of balance, and the performance of the lens system would not be well maintained. More preferably, the conditions (5) is limited to $1.10 < f_5/|f_4| < 1.35$, $f_4 < 0$, the condition (6) is limited to $0.68 < f_{10}/|f_7| < 0.73$, $f_7 < 0$, and the condition (7) is limited to $1.08 < f_9/|f_8| < 1.20$, $f_8 < 0$.

With the present invention, a bright, compact, high-performance behind aperture lens can be provided by being constructed to meet the above conditions.

Examples of the present invention will hereinafter be given with characters defined as follows:

$r_i$: radius of curvature of the ith surface from the object side, $d_i$: ith inter-surface gap from the object side, $n_i$: refractive index of the ith lens from the object side with respect to d-line, and $v_i$: Abbe number of the ith lens from the object side.

Example 1

| | f = 100 | F number 1: 2.9 | |
|---|---|---|---|
| | Angle of view 2ω = 62.0° | | |
| $r_1$ | 29.611 | $d_1$ 9.042 | $n_1$ 1.73400 | $v_1$ 51.5 |
| $r_2$ | 57.934 | $d_2$ 2.301 | | |
| $r_3$ | 167.541 | $d_3$ 2.262 | $n_2$ 1.66446 | $v_2$ 35.7 |
| $r_4$ | 24.584 | $d_4$ 1.788 | | |
| $r_5$ | 33.675 | $d_5$ 5.251 | $n_3$ 1.77250 | $v_3$ 49.7 |
| $r_6$ | 129.514 | $d_6$ 2.158 | | |
| $r_7$ | −84.421 | $d_7$ 2.121 | $n_4$ 1.60562 | $v_4$ 43.7 |
| $r_8$ | 43.782 | $d_8$ 1.044 | | |
| $r_9$ | 66.609 | $d_9$ 9.646 | $n_5$ 1.77250 | $v_5$ 49.7 |
| $r_{10}$ | −74.517 | | | |

Overall length (from the image plane) 111.0

$f/f_{1,2} = 1.38$ $(v_1 - v_2)/(v_1/n_1 - v_2/n_2) = 1.915$ $f/n_4|f_{7,8}| = 1.316 f/f_1 = 2.48$ $f_5/|f_4| = 1.18 f_{10}/|f_7| = 0.69$ $f_9/|f_8| = 1.19$

Example 2

| | f = 100 | F number 1: 2.9 | |
|---|---|---|---|
| | Angle of view 2ω = 64.1° | | |
| $r_1$ | 31.207 | $d_1$ 8.587 | $n_1$ 1.80400 | $v_1$ 46.6 |
| $r_2$ | 53.090 | $d_2$ 2.458 | | |
| $r_3$ | 234.799 | $d_3$ 2.369 | $n_2$ 1.68893 | $v_2$ 31.1 |
| $r_4$ | 26.946 | $d_4$ 1.184 | | |
| $r_5$ | 34.127 | $d_5$ 5.774 | $n_3$ 1.78590 | $v_3$ 44.2 |
| $r_6$ | 161.476 | $d_6$ 1.954 | | |
| $r_7$ | −85.964 | $d_7$ 2.221 | $n_4$ 1.64769 | $v_4$ 33.8 |
| $r_8$ | 42.936 | $d_7$ 0.888 | | |
| $r_9$ | 64.481 | $d_9$ 8.587 | $n_5$ 1.83400 | $v_5$ 37.2 |
| $r_{10}$ | −78.055 | | | |

Overall length (from the image plane) 110.8

$f/f_{1,2} = 1.25$ $(v_1 - v_2)/(v_1/n_1 - v_2/n_2) = 2.090$ $f/n_4|f_{7,8}| = 1.382 f/f_1 = 2.58$ $f_5/|f_4| = 1.11 f_{10}/|f_7| = 0.71$ $f_9/|f_8| = 1.17$

Example 3

| | f = 100 | F number 1: 2.9 | |
|---|---|---|---|
| | Angle of view 2ω = 63.6° | | |
| $r_1$ | 30.626 | $d_1$ 8.707 | $n_1$ 1.88300 | $v_1$ 40.8 |
| $r_2$ | 52.561 | $d_2$ 2.023 | | |
| $r_3$ | 145.047 | $d_3$ 2.345 | $n_2$ 1.78472 | $v_2$ 25.7 |
| $r_4$ | 26.384 | $d_4$ 1.349 | | |
| $r_5$ | 36.182 | $d_5$ 5.013 | $n_3$ 1.80400 | $v_3$ 46.6 |
| $r_6$ | 145.047 | $d_6$ 2.052 | | |
| $r_7$ | −75.987 | $d_7$ 2.257 | $n_4$ 1.58913 | $v_4$ 61.0 |
| $r_8$ | 41.770 | $d_8$ 0.792 | | |
| $r_9$ | 58.398 | $d_9$ 9.147 | $n_5$ 1.75700 | $v_5$ 47.9 |
| $r_{10}$ | −69.948 | | | |

Overall length (from the image plane) 109.8

$f/f_{1,2} = 1.43$ $(v_1 - \mu_2)/(v_1/n_1 - v_2/n_2) = 2.078$ $f/n_4|f_{7,8}| = 1.385 f/f_1 = 2.88$ $f_5/|f_4| = 1.34 f_{10}/|f_7| = 0.72$ $f_9/|f_8| = 1.09$

Example 4

| | f = 100 | F number 1: 2.9 | |
|---|---|---|---|
| | Angle of View 2ω = 63.1° | | |
| $r_1$ | 30.344 | $d_1$ 9.095 | $n_1$ 1.69680 | $v_1$ 55.5 |
| $r_2$ | 60.601 | $d_2$ 2.372 | | |
| $r_3$ | 160.358 | $d_3$ 2.300 | $n_2$ 1.74950 | $v_2$ 35.3 |
| $r_4$ | 25.995 | $d_4$ 1.415 | | |
| $r_5$ | 32.313 | $d_5$ 5.542 | $n_3$ 1.79952 | $v_3$ 42.2 |
| $r_6$ | 133.034 | $d_6$ 2.366 | | |
| $r_7$ | −73.826 | $d_7$ 2.156 | $n_4$ 1.61293 | $v_4$ 37.0 |
| $r_8$ | 43.996 | $d_8$ 1.117 | | |
| $r_9$ | 71.326 | $d_9$ 9.448 | $n_5$ 1.84100 | $v_5$ 43.2 |
| $r_{10}$ | −72.183 | | | |

Overall length (from the image plane) 112.9

$f/f_{1,2} = 1.29$ $(v_1 - v_2)/(v_1/n_1 - v_2/n_2) = 1.612$ $f/n_4|f_{7,8}| = 1.388 f/f_1 = 2.30$ $f_5/|f_4| = 1.2 f_{10}/|f_7| = 0.71$ $f_9/|f_8| = 1.18$

What is claimed is:

1. A compact, five-element, high-performance behind aperture lens comprising a positive meniscus first lens, a negative second lens, a positive third lens, a biconcave negative fourth lens, and a biconvex positive fifth lens, said lenses being arranged in the order from the object side, said behind aperture lens system satisfying the following conditions:

(1) $1.15 < f/f_{1,2} - 1.55$
(2) $1.600 < (v_1 - v_2)/(v_1/n_1 - v_2/n_2)$
(3) $1.200 < f/n_4|f_{7,8}| < 1.450, f_{7,8} < 0$
(4) $2.10 < f/f_1 < 3.00$
(5) $0.90 < f_5/|f_4| < 1.50, f_4 < 0$
(6) $0.60 < f_{10}/|f_7| < 0.80, f_7 < 0$
(7) $1.00 < f_9/|f_8| < 1.30, f_8 < 0$ where f: combined focal length of the overall lens system, $f_{1,2}$: focal length of the first lens, $v_i$: Abbe number of the ith lens, $n_i$: refractive index of the ith lens with respect to d-line, $f_{7,8}$: focal length of the fourth lens, $f_1$: focal length of the first lens on its surface on the object side, $f_4$: focal length of the second lens on its surface on the image side, $f_5$: focal length of the third lens on its surface on the object side, $f_7$: focal length of the fourth lens on its surface on the object side, $f_8$: focal length of the fourth lens on its surface on the image side, $f_9$: focal length of the fifth lens on its surface on the object side, and $f_{10}$: focal length of the fifth lens on its surface on the image side.

2. The lens system according to claim 1 satisfying the following conditions:

(1) $1.24 < f/f_{1,2} < 1.44$
(2) $1.600 < (\nu_1 - \nu_2)/(\nu_1/n_1 - \nu_2/n_2)$
(3) $1.310 < f/n_4|f_{7,8}| < 1.390, f_{7,8} < 0$
(4) $2.28 < f/f_1 < 2.90$
(5) $1.10 < f_5/|f_4| < 1.35, f_4 < 0$
(6) $0.68 < f_{10}/|f_7| < 0.73, f_7 < 0$
(7) $1.08 < f_9/|f_8| < 1.20, f_8 < 0$.

3. The lens system according to claim 2 further satisfying the following chart:

| | f = 100 | F number 1: 2.9 | | |
| | Angle of view $2\omega$ = 62.0° | | | |
|---|---|---|---|---|
| $r_1$ | 29.611 | $d_1$ 9.042 | $n_1$ 1.73400 | $\nu_1$ 51.5 |
| $r_2$ | 57.934 | $d_2$ 2.301 | | |
| $r_3$ | 167.541 | $d_3$ 2.262 | $n_2$ 1.66446 | $\nu_2$ 35.7 |
| $r_4$ | 24.584 | $d_4$ 1.788 | | |
| $r_5$ | 33.675 | $d_5$ 5.251 | $n_3$ 1.77250 | $\nu_3$ 49.7 |
| $r_6$ | 129.514 | $d_6$ 2.158 | | |
| $r_7$ | −84.421 | $d_7$ 2.121 | $n_4$ 1.60562 | $\nu_4$ 43.7 |
| $r_8$ | 43.782 | $d_8$ 1.044 | | |
| $r_9$ | 66.609 | $d_9$ 9.646 | $n_5$ 1.77250 | $\nu_4$ 49.7 |
| $r_{10}$ | −74.517 | | | |

Overall length (from the image plane) 111.0
$f/f_{1,2} = 1.38$
$(\nu_1 - \nu_2)/(\nu_1/n_1 - \nu_2/n_2) = 1.915$
$f/n_4|f_{7,8}| = 1.316 f/f_1 = 2.48$
$f_5/|f_4| = 1.18 f_{10}/|f_7| = 0.69$
$f_9/|f_8| = 1.19$.

4. The lens system according to claim 2 further satisfying the following chart:

| | f = 100 | F number 1: 2.9 | | |
| | Angle of view $2\omega$ = 64.1° | | | |
|---|---|---|---|---|
| $r_1$ | 31.207 | $d_1$ 8.587 | $n_1$ 1.80400 | $\nu_1$ 46.6 |
| $r_2$ | 53.090 | $d_2$ 2.458 | | |
| $r_3$ | 234.799 | $d_3$ 2.369 | $n_2$ 1.68893 | $\nu_2$ 31.1 |
| $r_4$ | 26.946 | $d_4$ 1.184 | | |
| $r_5$ | 34.127 | $d_5$ 5.774 | $n_3$ 1.78590 | $\nu_3$ 44.2 |
| $r_6$ | 161.476 | $d_6$ 1.954 | | |
| $r_7$ | −85.964 | $d_7$ 2.221 | $n_4$ 1.64769 | $\nu_4$ 33.8 |
| $r_8$ | 42.936 | $d_7$ 0.888 | | |
| $r_9$ | 64.481 | $d_9$ 8.587 | $n_5$ 1.83400 | $\nu_5$ 37.2 |
| $r_{10}$ | −78.055 | | | |

Overall length (from the image plane) 110.8
$f/f_{1,2} = 1.25$
$(\nu - \nu_2)/(\nu_1/n_1 - \nu_2/n_2) = 2.090$
$f/n_4|f_{7,8}| = 1.382 f/f_1 = 2.58$
$f_5/|f_4| = 1.11 f_{10}/|f_7| = 0.71$
$f_9/|f_8| = 1.17$.

5. The lens system according to claim 2 further satisfying the following chart:

| | f = 100 | F number 1: 2.9 | | |
| | Angle of view $2\omega$ = 63.6° | | | |
|---|---|---|---|---|
| $r_1$ | 30.626 | $d_1$ 8.707 | $n_1$ 1.88300 | $\nu_1$ 40.8 |
| $r_2$ | 52.561 | $d_2$ 2.023 | | |
| $r_3$ | 145.047 | $d_3$ 2.345 | $n_2$ 1.78472 | $\nu_2$ 25.7 |
| $r_4$ | 26.384 | $d_4$ 1.349 | | |
| $r_5$ | 36.182 | $d_5$ 5.013 | $n_3$ 1.80400 | $\nu_3$ 46.6 |
| $r_6$ | 145.047 | $d_6$ 2.052 | | |
| $r_7$ | −75.987 | $d_7$ 2.257 | $n_4$ 1.58913 | $\nu_4$ 61.0 |
| $r_8$ | 41.770 | $d_8$ 0.792 | | |
| $r_9$ | 58.398 | $d_9$ 9.147 | $n_5$ 1.75700 | $\nu_5$ 47.9 |
| $r_{10}$ | −69.948 | | | |

Overall length (from the image plane) 109.8
$f/f_{1,2} = 1.43$
$(\nu_1 - \nu_2)/(\nu_1/n_1 - \nu_2/n_2) = 2.078$
$f/n_4|f_{7,8}| = 1.385 f/f_1 = 2.88$
$f_5/|f_4| = 1.34 f_{10}/|f_7| = 0.72$
$f_9|f_8| = 1.09$.

6. The lens system according to claim 2 further satisfying the following chart:

| | f = 100 | F number 1: 2.9 | | |
| | Angle of View $2\omega$ = 63.1° | | | |
|---|---|---|---|---|
| $r_1$ | 30.344 | $d_1$ 9.095 | $n_1$ 1.69680 | $\nu_1$ 55.5 |
| $r_2$ | 60.601 | $d_2$ 2.372 | | |
| $r_3$ | 160.358 | $d_3$ 2.300 | $n_2$ 1.74950 | $\nu_2$ 35.3 |
| $r_4$ | 25.995 | $d_4$ 1.415 | | |
| $r_5$ | 32.313 | $d_5$ 5.542 | $n_3$ 1.79952 | $\nu_3$ 42.2 |
| $r_6$ | 133.034 | $d_6$ 2.366 | | |
| $r_7$ | −73.826 | $d_7$ 2.156 | $n_4$ 1.61293 | $\nu_4$ 37.0 |
| $r_8$ | 43.996 | $d_8$ 1.117 | | |
| $r_9$ | 71.326 | $d_9$ 9.448 | $n_5$ 1.84100 | $\nu_5$ 43.2 |
| $r_{10}$ | −72.183 | | | |

Overall length (from the image plane) 112.9
$f/f_{1,2} = 1.29$
$(\nu_1 - \nu_2)/(\nu_1 n_1 - \nu_2/n_2) = 1.612$
$f/n_4|f_{7,8}| = 1.388 f/f_1 = 2.30$
$f_5/|f_4| = 1.2 f_{10}/|f_7| = 0.71$.
$f_9/|f_8| = 1.18$.

* * * * *